United States Patent [19]
Johnson et al.

[11] 4,456,989
[45] Jun. 26, 1984

[54] SIGNAL TRANSFORMATION APPARATUS

[76] Inventors: Alfred O. Johnson, 12603 Little Stones La.; Donald E. Rogness, 358 Linden Ct., both of Herndon, Va. 22070; George W. White, 1523 Cameron Crescent Dr., Reston, Va. 22090

[21] Appl. No.: 405,471

[22] Filed: Aug. 5, 1982

[51] Int. Cl.³ .............................................. H04J 6/00
[52] U.S. Cl. ......................................... 370/94; 370/60
[58] Field of Search ................... 370/94, 92, 60, 99

[56] References Cited
U.S. PATENT DOCUMENTS
4,238,851  12/1980  Takahashi et al. ..................... 370/94

FOREIGN PATENT DOCUMENTS
0025753  3/1981  European Pat. Off. .............. 370/94
57-5453  1/1982  Japan ..................................... 370/94

Primary Examiner—Douglas W. Olms

[57] ABSTRACT

A system employing packet switching techniques wherein time delays are reduced sufficiently to permit data and voice signals to be processed interchangeably in a common communications system wherein TDM signals are transformed into packet signals and packet signals are transformed into TDM signals, both transformations taking place with suitably minimized delays.

7 Claims, 2 Drawing Figures

SIGNAL TRANSFORMATION APPARATUS

BACKGROUND OF THE INVENTION

Two-way voice conversations between parties at different locations make use of techniques which process voice signals in real time. On the other hand, when data is to be transmitted back and forth between different locations, it is not necessary to use real-time processing techniques. In contradistinction, it normally is undesirable economically to process such signals in real time, and techniques often are employed which involve time delays which are not significant for data, but which are too large for voice processing.

On technique often used in transmission of two-way voice conversations in real time is known as time division multiplex (TDM). One technique often used in transmission of data which incorporates time delays too large for voice processing is known as packet switching, a form of statistical TDM.

For many purposes, it is advantageous economically to employ a communication system which can transmit voice conversations and/or data interchangeably. It is well known to those skilled in the art that packet switching techniques would have certain inherent advantages as compared to TDM techniques for processing voice signals if the time presently utilized in packet switching could be sufficiently reduced to approximate those utilized in real time processing.

The present invention is directed toward a system employing packet switching techniques wherein the time delays have been sufficiently reduced to permit data and voice signals to be processed interchangeably in a common communication system. To this end it is necessary to convert signals in TDM form to signals in packet form and vice versa. More particularly the present invention is directed toward a new type of signal transformation apparatus wherein TDM signals are transformed into packet signals and packet signals are transformed into TDM signals, both transformations taking place with suitably minimized delays.

SUMMARY OF THE INVENTION

Signal transformation apparatus in accordance with the principles of the invention is adapted for connection between a TDM bus and a packet bus. The TDM bus and the packet bus carry information in byte form in time sequence. The TDM bus carries (n) different voice channels in time division multiplex format wherein one-byte samples from each channel are combined into a frame together with appropriate frame synchronization signals. The frames are transmitted in time sequence.

The apparatus in order to transfer TDM signals into packet signals employs TDM and packet storage elements.

First means, coupled between said TDM bus and said TDM element, transfers a first plurality of bytes, for example (n) bytes, on one selected channel, taken from (n) successive frames from said TDM bus, to said TDM element for storage as an information field therein. The bytes are disposed in immediate time sequence, being the first, second, ... (n)th bytes in the selected channel and are obtained from the first, second and (n)th successive frames.

Second means, coupled between said TDM element and said packet element, transfers said information field to said packet element for storage therein.

Third means, coupled to said packet element, causes a second plurality of bytes to be stored in the packet element as a header field therein in combination with the information field. The header field uniquely identifies the one selected voice channel.

Fourth means, coupled between said packet element and said packet bus, causes the fields stored therein to be transferred from said packet element to the packet bus.

Fifth means causes a check byte to be combined with the bytes in the information field and in the header either in the packet element or in the fifth means whereby a packet formed by the combination of the information field, header field and check byte is transferred to the packet bus.

In this way, the apparatus transforms TDM signals into signal packets. Each packet can be constituted by thirteen bytes of information wherein the header field contains four bytes, the information field contains eight bytes and there is one check byte.

The apparatus, in order to transform packet signals into TDM signals, again employs TDM and packet storage elements.

Under these conditions, however, first means, coupled between the packet bus and the packet element, transfers the packet from the packet bus to the packet element for storage therein.

Third means, coupled between the packet element and the TDM element, transfers the stored information field from the packet element to the TDM element.

Fourth means, coupled between the TDM element and the TDM, transfers the stored information field from the TDM element to the TDM bus. The field is transferred byte by byte onto the TDM bus, the transfer occurring in each of eight successive frames.

It is necessary to synchronize the transformation operation, and this is accomplished by using suitably timed control pulses supplied to the various means and produced by a time slot generator which is synchronized by frame synchronization signals obtained from the TDM bus. In particular TDM bytes are transferred from the TDM bus to the TDM storage element while the disassembled bytes from the information field are being transferred from the TDM storage element to the TDM bus.

DETAILED DESCRIPTION OF PREFERRED EMBODIMENTS

Figure 1:
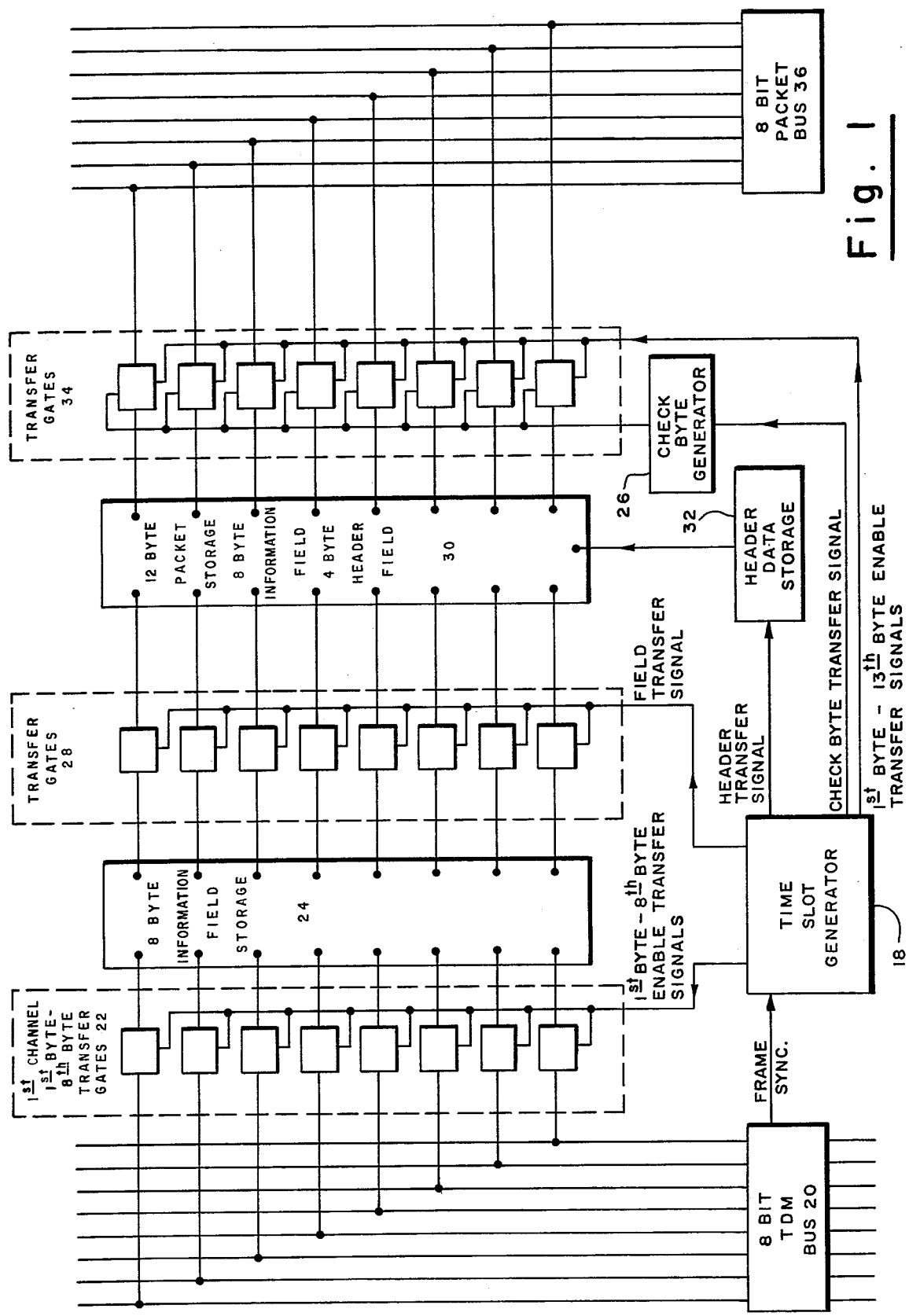
FIG. 1 is a block diagram of signal transformation apparatus in accordance with the invention for transforming TDM signals into packet signals.

FIG. 1 illustrates the apparatus for transforming TDM signals into packets. TDM signals in pulse code modulated form flow in eight-bit parallel bytes along TDM bus 20. There are n different signal channels per frame whereby the first byte of the first channel is followed by the first byte of the second channel and so on to the first byte of the (n)th channel whereby the frame is formed, the first byte of the (n)th channel being followed by the second byte of the first channel and so on to form the second and successive frames. Each frame carries frame synchronization signals.

In order to transform TDM signals into packet signals, the first eight bytes on the first channel are successively transferred byte by byte in eight successive frames via transfer gates 22 enabled by suitably timed transfer signals to an eight-byte storage element 24. This collection of eight bytes is defined as an information field.

The information field is then transferred byte by byte via transfer gates 28 under the control of field transfer signals to packet storage element 30.

The packet is assembled in element 30 by adding four bytes as header information or a header field to uniquely identify the channel and the particular bytes involved whereby a unique one-to-one relationship is established between the channel and the particular bytes on the one hand and the resultant packet on the other hand. It will be recalled at this point that voice signals in TDM format are transformed to packet form for processing and the packet must be transformed back into TDM format whereby the caller and the called party can conduct a conversation in real time. Without this unique one-to-one relationship, such conversation cannot be conducted in the manner described herein.

The header field is stored in storage element 32 and is released byte by byte into element 30. Each new entry into element 20 is written over and destroys any previously stored entry.

A check byte is added to the stored information field and stored header to complete the assembly of the packet. This can be done by adding the check bytes to the stored fields in element 30 or can be supplied in proper timing to gates 34 after the stored field and header are transferred byte by byte by transfer gates 34 to the packet bus 36. In other words, the complete packet can be assembled in element 30 or can be assembled in situ as the process for transferring bytes to the packet bus is completed.

In the arrangement shown in FIG. 1, the check bytes are produced in generator 26 and are supplied via gates 34 so that the packet is not completely assembled until it is disposed on bus 36.

The timing of the transformation is controlled by suitable enabling transfer signals supplied to the various units via time slot generator 18. This generator receives frame synchronization signals via the TDM bus to insure proper system timing.

Figure 2:
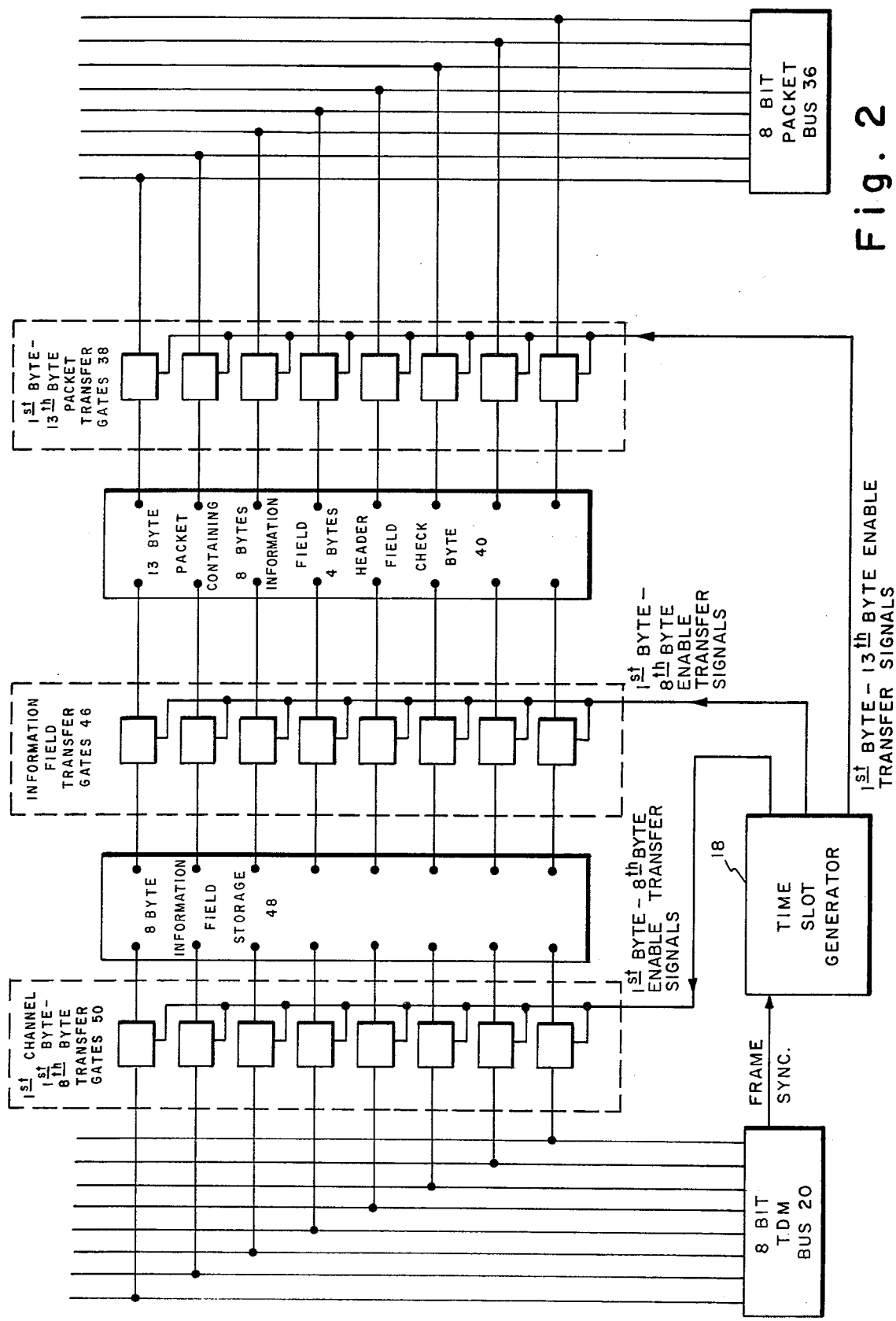
FIG. 2 is a block diagram of signal transformation apparatus in accordance with the invention for transforming packet signals into TDM signals.

FIG. 2 illustrates the apparatus for transforming packet signals into TDM signals. It should be noted that the TDM bus 20, the packet bus 36 and the time slot generator are common to both FIGS. 1 and 2.

In order to transform packet signals into TDM signals, a packet is transferred byte by byte from the packet/bus to a packet storage element 40 via transfer gates 38 under the control of suitably timed transfer signals.

The information field of the packet is then transferred via transfer gates 46 to an information field storage element 48. The field is then transferred byte by byte in successive frames from element 48 via transfer gates 50 to the TDM bus 20.

The gates, buses, storage elements and the like employed in FIGS. 1 and 2 are all of known type and hence are shown only in block form.

What is claimed is:

1. Signal transformation apparatus adapted for connection between a TDM bus and a packet bus, said TDM bus and said packet bus carrying information in parallel byte form in time sequence, said TDM bus carrying (n) different voice channels in time division multiplex format, said apparatus comprising:

TDM and packet storage elements;

first means coupled between said TDM bus and said TDM element for transferring, byte by byte, a first plurality of bytes disposed in immediately adjacent time sequence on one selected channel from said TDM bus to said TDM element for storage as an information field therein;

second means coupled between said TDM element and said packet element for transferring, byte by byte, said information field from said TDM element to said packet element for storage therein;

third means coupled to said packet element for transferring a second plurality of bytes to said packet element for storage therein as a header field in combination with the stored information field, the header field uniquely identifying said selected channel;

fourth means coupled between said packet element and said packet bus for transferring the fields stored in the element, byte by byte, from said packet element onto the packet bus and, fifth means for adding a check byte to said stored fields before the transfer onto the packet bus is completed.

2. The apparatus of claim 1 wherein said fifth means is coupled to said fourth means.

3. Signal transformation apparatus adapted for connection between a TDM bus and a packet bus, said TDM bus and said packet bus carrying information in byte form in time sequence, said TDM bus carrying (n) different voice channels in time division multiplex format, said apparatus comprising:

TDM and packet storage elements;

first means coupled between said TDM bus and said TDM element for transferring a first plurality of bytes disposed in immediately adjacent time sequence on one selected channel from said TDM bus to said TDM element for storage as an information field therein;

second means coupled between said TDM element and said packet element to transfer said information field from said TDM element to said packet element for storage therein;

third means coupled to said packet element for transferring a second plurality of bytes to said packet element for storage therein as a header field in combination with the information field, the header field uniquely identifying said selected channel;

fourth means coupled between said packet element and said packet bus for transferring the fields stored in the packet element from said packet element onto the packet bus; and fifth means for adding a check byte to said stored fields before the transfer onto the packet bus is completed.

4. Signal transformation apparatus adapted for connection between a TDM bus and a packet bus, said TDM bus and said packet bus carrying information in parallel byte form in time sequence, said TDM bus carrying (n) different voice channels in time division multiplex format, said packet bus carrying individual packets in time sequence, each packet having a header field uniquely identifying a selected one of said channels, an information field containing a plurality of bytes which are in immediately adjacent time sequence on said selected one channel and a check byte, said apparatus comprising:
- packet and TDM storage elements;
- first means coupled between said packet bus and said packet element for transferring said packet, byte by byte, from said packet bus to said packet element for storage as a packet therein;
- second means coupled between said packet element and said TDM element for transferring the stored information field from the packet element to the TDM element; and
- third means coupled between said TDM element and said TDM bus for transferring said stored field, byte by byte, from said TDM element to the TDM bus.

5. Signal transformation apparatus adapted for connection between a TDM bus and a packet bus, said TDM bus and said packet bus carrying information in parallel byte form in time sequence, said TDM bus carrying (n) different voice channels in time division multiplex format, said packet bus carrying individual packets in time sequence, each packet having a header field uniquely identifying a selected one of said channels, an information field containing a plurality of bytes which are in immediately adjacent time sequence on said selected one channel and a check byte, said apparatus comprising:
- first and second packet storage elements;
- first and second TDM storage elements;
- first means coupled between said TDM bus and said first TDM element for transferring a first plurality of bytes disposed in immediately adjacent time sequence on one selected channel from said TDM bus to said first TDM element for storage as an information field therein;
- second means coupled between said TDM element and said first packet element to transfer said information field from said first TDM element to said first packet element for storage therein;
- third means coupled to said first packet element for transferring a second plurality of bytes to said first packet element for storage therein as a header field in combination with the information field, the header field uniquely identifying said selected channel;
- fourth means coupled between said first packet element and said packet bus for transferring said stored fields from said first packet element onto the packet bus;
- fifth means coupled to said fourth means to add a check byte to said stored fields before the transfer onto the packet bus is completed;
- sixth means coupled between said packet bus and said second packet element for transferring said packet, byte by byte, from said packet bus to said second packet element for storage as a packet therein;
- seventh means coupled between said packet element and said second TDM element for transferring the stored information field from the second packet element to the second TDM element; and
- eighth means coupled between said second TDM element and said TDM bus for transferring said stored field, byte by byte, from said second TDM element to the TDM bus.

6. Apparatus as set forth in claim 5 further including a time slot generator driving frame synchronization timing from the TDM bus and supplying suitably timed control signals to each of said elements and means.

7. Apparatus as set forth in claim 6 wherein said generator causes TDM signal to packet signal transformation and packet signal transformation to TDM signal transformation to be carried out at the same time.

* * * * *